Jan. 17, 1961   J. R. ZIMMERMAN ET AL   2,968,761
NUCLEAR RELAXATION TIME RATIO MEASUREMENTS
Filed May 20, 1954
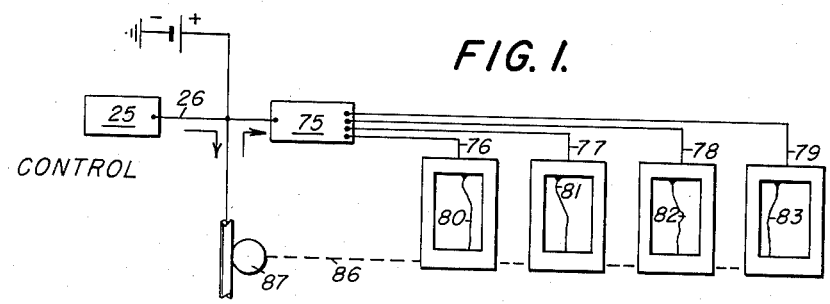
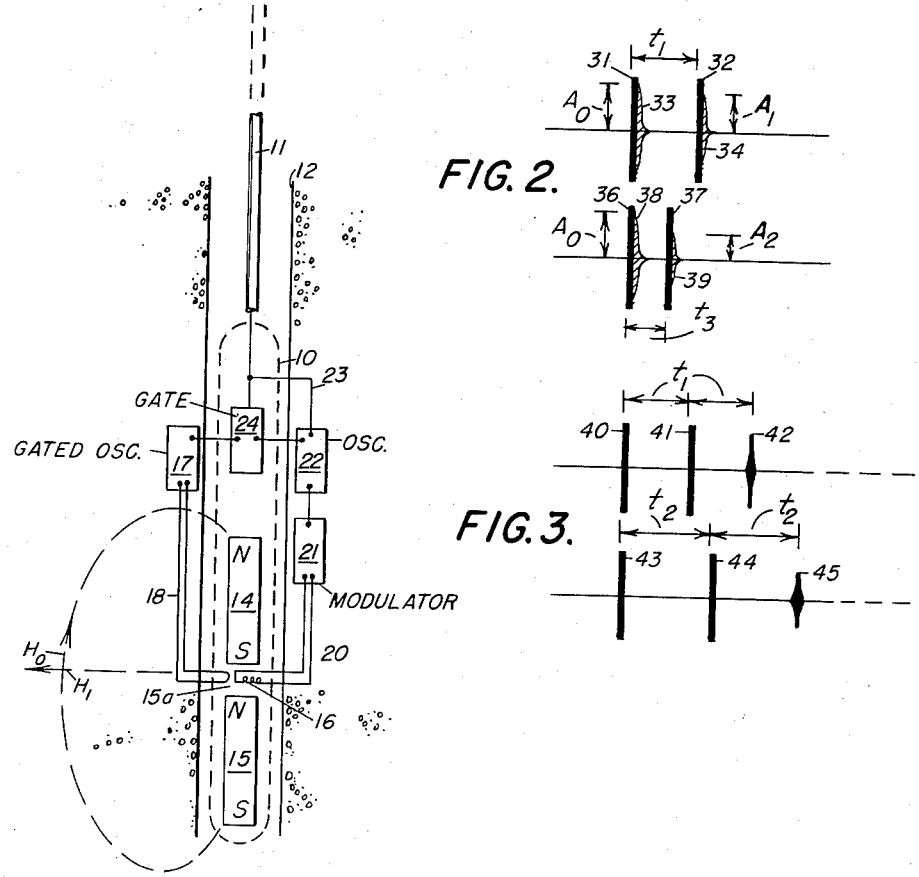
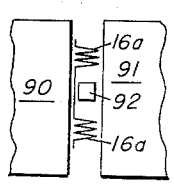
JOHN R. ZIMMERMAN
JOHN O. ELY
INVENTORS
BY D. Carl Richards
ATTORNEY 2,968,761

NUCLEAR RELAXATION TIME RATIO MEASUREMENTS

John R. Zimmerman and John O. Ely, Dallas, Tex., assignors, by mesne assignments, to Socony Mobil Oil Company, Inc., New York, N.Y., a corporation of New York Filed May 20, 1954, Ser. No. 431,204

8 Claims. (Cl. 324—.5)

This invention relates to the identification of certain bulk liquids and liquids in porous media as related to nuclear resonances thereof and more specifically to depicting the relationships between transverse and longitudinal nuclear relaxation times. By this means bulk crude oils may be distinguished from those liquids of a non-petroliferous nature. In a still more specific aspect the invention relates to distinguishing between fluids of crude oil character and fluids generally characterized as formation waters.

In Patent No. 2,561,489 to Bloch et al. there is disclosed a direct method of identifying particular atoms which involves the phenomena known as nuclear magnetic resonance. Applying this phenomena to the study of molecules, where pure substances are employed, it has been found that the molecular environment of the protons peculiarly controls the measurable phenomena. When such measurements are attempted in the presence of impurities, ambiguous results rather than readily interpretable results are obtained.

In general, measurements of nuclear magnetic resonance have been directly related to "relaxation times." Two relaxation times are of particular interest. They are generally identified as "longitudinal relaxation time" ($T_1$) and "transverse relaxation time" ($T_2$). The longitudinal relaxation time ($T_1$) is a quantity related to processes instrumental in effecting a change in the total spin energy of a system of nuclei of a given element under the influence of a unidirectional magnetic field. The transverse relaxation time ($T_2$) is a measurable phenomenon due to the fact that the nuclear system of the given element in the unidirectional magnetic field represents a finite processional frequency spectrum. Stated otherwise, nuclei of a given element may be polarized in a magnetic field or may be aligned with the magnetic field. If an alternating magnetic field is applied having direction normal to the polarizing magnetic field, the alignment of the system will be disturbed or upset. Upon removal of the alternating field, the upset or perturbed nuclei will precess relative to the polarizing field but will not all precess at the same frequency. The transverse relaxation time $T_2$ is inversely proportional to the resonance line width of a given element and is a measure of the total contribution to the resonance line width.

Measurements of the relaxation times $T_1$ and $T_2$ have been made by placing a sample of material in a strong polarizing field and subjecting it to a radio-frequency field normal to the unidirectional field either by application of continuous radio-frequency energy or by application of periodically pulsed radio-frequency energy. Such measurements of contaminated samples of materials have been found to be dispositive of the character of the material and, in general, are not interpretable. However, it has now been found that a measurement of the ratio of the longitudinal relaxation time to the transverse relaxation time provides a positive identification of the character of certain fluids in bulk. This is particularly true when proton resonances are studied in the presence of contaminants such as commonly are encountered in earth formations associated with petroleum reservoirs.

In accordance with the present invention, four measurements are made, two of which are dependent upon longitudinal relaxation time $T_1$ and two of which are dependent upon transverse relaxation time $T_2$. More particularly, liquids such as derived from subterranean reservoirs are nuclearly polarized and subsequently perturbed by pairs of pulsed fields of predetermined radio-frequency. Free decay signals and spin echo signals are then measured for at least two different intervals between the pairs of radio-frequency pulses.

In a more specific aspect of the invention, there is provided a well logging instrument in which there is provided a means for establishing a unidirectional field to nuclearly polarize atoms in the field of influence thereof together with means for perturbing polarized atoms in selected regions of the unidirectional magnetic field and means for detecting free decay signals and spin echo signals for each of a plurality of locations along the bore hole. Four measured values are then plotted as a function of bore hole depth which provide a means for the identification of the character of the fluids at each of a plurality of regions in the bore hole. In another aspect of the invention there is provided a flow path through the well exploring tool so that bore hole fluids may course through the magnetic field whereby measurements are made of the character of the bore hole fluids. In another aspect, there is provided means for establishing a high intensity field in the formations and means for substantially preventing variations in the bore hole fluids in the magnetic field. Movement of the unit along the bore hole and adjacent the bore hole walls then produces variations in free decay signals and in spin echo signals which are dependent primarily upon variations in the liquid bearing properties of the adjacent formations and are substantially independent of variations in the bore hole fluids.

Measurements of both free decay signals and spin echo signals for any given sample may be utilized to compute longitudinal relaxation times and transverse relaxation times. For bulk hydrocarbons the ratio of relaxation times, in general, exceeds a predetermined level even in the presence of contaminants whereas the ratio of relaxation times for non-petroliferous fluids such as water is substantially less than the predetermined level, there being a definite line of demarcation between values found for water and for petroleum liquids.

For a more complete understanding of the invention, reference may now be had to the following description taken in conjunction with the accompanying drawings in which:

Fig. 1 diagrammatically illustrates one form of nuclear induction measuring system;

Fig. 2 is a time plot of voltage functions used in Fig. 1 for determination of a first relaxation time;

Fig. 3 is a time plot of voltage functions used in Fig. 1 for measuring a second relaxation time; and Fig. 4 is an enlarged view of the magnet coil structure such as embodied in Fig. 1.

Referring now to Fig. 1, an exploring unit generically illustrated by the dotted outline 10 is supported by cable 11 in bore hole 12. Means not shown are provided at the earth's surface for effecting desired movement of the unit 10 along the length of the bore hole 12. The bore hole unit 10 includes as a first component a means for producing a unidirectional magnetic field in formations adjacent hole 12. In the form illustrated, a pair of permanent magnets 14 and 15, cylindrical in form, are positioned in an end-to-end array parallel to the axis of the bore hole. Due to a magnetic field $H_0$ of magnets 14 and 15, magnetic flux from magnets 14 and 15 threads the air gap 15a and also courses through the adjacent earth formations. A coil 16 is positioned midway between magnets 14 and 15 in air gap 15a. A magnetic field $H_1$ is produced upon energization of coil 16 having a vector representation which is at right angles with respect to the vectorial representation of the unidirectional field $H_0$. An oscillator 17 is electromagnetically coupled by way of circuit 18 to coil 16 for applying radio-frequency pulses thereto. The nuclei of atoms which will be forced into alignment with the magnetic field $H_0$ may be predetermined by proper selection of the strength of the field $H_0$ and the frequency of the energy exciting coil 16. For example, protons of hydrogen will be perturbed at resonance if the frequency of excitation for coil 16 is equal to $\gamma H_0$ where $\gamma$ is the gyromagnetic ratio for hydrogen nuclei.

More particularly, Fig. 2 illustrates a program of pulse sequences and measuring sequences that demonstrate the measurement of the longitudinal relaxation time $T_1$ of such aligned or nuclearly polarized atoms. Two radio-frequency pulses 31 and 32 whose envelopes are represented by the darkened rectangles are applied in accordance with a predetermined program to coil 16. The time duration of each pulse is relatively short and the pulses are spaced apart by a time interval $t_1$. Immediately following the removal of pulse 31, there is a dectectable radio-frequency signal of an abruptly decreasing amplitude. The envelope of such signal is represented by the crosshatched section 33. The amplitude of this pulse at a time coinciding with the cutoff of pulse 31, for the purpose of this description, will be denoted as $A_0$. Following pulse 32 there is a similar detectable signal represented by the envelope 34. However the maximum amplitude of $A_1$ of signal 34 is less than $A_0$. If after a time interval sufficient for the protons to reach equilibrium a second pair of pulses such as pulses 36 and 37 are applied to coil 16, there will be a first decay signal 38 whose amplitude is equal to $A_0$ and a second decay signal 39 following pulse 37. Signal 39 has a much decreased amplitude $A_2$, the difference in amplitude relative to the amplitude $A_1$ being dependent upon the relative intervals $t_1$ and $t_3$ between pulses 31 and 32 and pulses 36 and 37, respectively. In general the amplitude of a second decay pulse (for example $A_1$ or $A_2$) relative to the amplitude of a first delay pulse (for example $A_0$) may be expressed as follows:

$$A = A_0(1 - e^{-t/T_1}) \quad (1)$$

where:

$t$ is the time between pulses, and
$T_1$ is the longitudinal relaxation time.

It will thus be seen that a plot of the log $[(A_0-A)/A]$ versus $t$ will provide for a direct measurement of $T_1$, e.g. the slope of the resultant function. With the pulse program and measuring program diagrammatically illustrated in Fig. 2, the information necessary for making the above plot or for otherwise computing is readily available merely by varying $t$.

Referring now to Fig. 3, a pulse sequence and measuring sequence are illustrated which will provide data for evaluating the transverse relaxation time $T_2$. More particularly, two pulses 40 and 41 are applied to coil 16 spaced a time interval $t_1$ from one another. Following the onset of pulse 41 by a similar time interval $t_1$, there appears an echo signal 42. The amplitude of pulse 42 is then sensed and applied to modulator 21. After a time interval following pulse 41 such that the protons may reach equilibrium in the field $H_0$, a second series of pulses is then applied to coil 16. Radio-frequency pulses 43 and 44 spaced a time interval $t_2$ cause nuclear perturbations which result in an echo signal 45. The longer the period $t$ becomes, the smaller will be the resultant echo signal. The amplitudes of echo signals 42 and 45 are related to transverse relaxation time $T_2$ in the following manner:

$$V(t) \propto e^{-2t/T_2} e^{-kt^3} \quad (2)$$

where:

$t$ is one-half of the interval between the first pulse of each pair of pulses and an echo signal as shown in Fig. 3, and $k$ is a constant dependent upon the molecular thermal diffusion rate of the nuclear sample and the gradient of the unidirectional magnetic field $H_0$. (More particularly $$k = (\gamma G)^2 \frac{D}{3} \quad (3)$$

where:

$\gamma$ is the gyromagnetic ratio of the nuclei under investigation,
$G$ is the magnetic field gradient of the unidirectional field $H_0$, and
$D$ is the molecular thermal diffusion coefficient.)

For low values of $T_2$, measurement of $T_2$ is substantially independent of diffusion effects (or of $k$). Thus, measurement of the echoes 42 and 45, etc. for different values of $t$ may provide data necessary for evaluation of the transverse relaxation time $T_2$.

It has been found that the ratio of $T_1$ to $T_2$ for crude oils in the presence of contaminants is numerically greater than 3. In contrast, it has been found that the ratio of $T_1$ to $T_2$ for waters extracted from earth formations is numerically less than 3 even though contaminated with such constituents as ferric ions ($Fe^{++}$), ferrous ions ($Fe^{+++}$), nickolous ions ($Ni^{++}$), cobaltous ions ($Co^{++}$), cupric ions ($Cu^{++}$) and vanadium ions ($Va^{++++}$). Thus, even though such paramagnetic ions are encountered, they do not sufficiently modify the ratio of $T_1$ to $T_2$ to render the results ambiguous.

In accordance with the present invention, four distinct functions are measured in order to provide such unambiguous identification of the character of the subject under test. More particularly, the coil 16 is utilized for generating the perturbing field in the test material and also for detecting the resonant effects. A circuit 20 leads to a modulator 21 whose output in turn controls an oscillator 22. The modulated output signal from oscillator 22 is then applied to the bore hole cable by way of channel 23. A gating unit 24 is connected both to the oscillator 17 and to the oscillator 22 in order suitably to program the operation of the radio-frequency circuits. More particularly, gate 24 serves to turn oscillator 17 on to produce such pulses as pulses 31 and 32, Fig. 2. Following pulses 31 or 32, gate 24 de-energizes oscillator 17 and energizes modulator 21 and oscillator 22. As well understood by those skilled in the art, selected programming sequences may be utilized under control of unit 25 to produce signals on cable 11 representative of the free decay signals 33, 34, etc., Fig. 2, or the pulse echo signals 42, 45, Fig. 3. Four such signals, two free decay signals and two pulse echo signals, are then segregated in the unit 75, a demodulator, in response to the control 25, in order separately to record each of the four signals. For example, the four signals may be transmitted by way of channels 76, 77, 78, 79 to the recorders 80, 81, 82, 83, respectively. The recorders are coupled as indicated by the line 86 to a wheel 87 which is driven in proportion to movement of cable 11 in the bore hole 12. The four recorders 80–83 then may represent continuous depth indications of the variations in the four functions to be utilized in computing $T_1$ and $T_2$.

In accordance with another mode of logging, the bore hole unit 10 may be positioned against the bore hole wall at each of a plurality of selected depths and a pulse program such as illustrated in Figs. 2 and 3 carried out to produce four values at the earth's surface which are controlled by the character of the fluids in the earth adjacent such points and the character of the earth itself. An index to the character of the earth formation is thus provided.

In still another mode of logging, the unit 10 is positioned at a fixed point, for example adjacent or immediately above a producing horizon, and a flow path provided therethrough whereby the liquids flowing from the formations are passed through air gap 15a. There will then be recorded on recorders 80–83, four functions that are controlled by the character of the fluids alone. If desired and as generically represented by Fig. 4, the bore hole unit 10 may be replaced by a surface measuring system, only a portion of which is shown in Fig. 4. A magnetic field producing device having pole pieces 90 and 91 is adapted to receive a sample of earth material 92 as, for example, a section of core removed from a bore hole. The core is adjacent exciting coils 16a which serve to perturb certain atoms nuclearly polarized by the magnetic field between pole pieces 90 and 91. Here again four functions may be measured for the computation of longitudinal and transverse relaxation times. The ratio of such times may then be computed to determine the character of the material under test. In either case any selected test sample is operated upon to produce four measured parameters.

When a well exploring unit 10 is utilized to produce measurements dependent upon the character of the formations, the unit will be positioned successively at each of a plurality of separated points while the four measurements are made. If the device is utilized to measure the character of fluids flowing in a well bore, the unit preferably will be moved along the direction of flow of the fluids at substantially the same rate as the fluid flow so that relative motion between the area of nuclear polarization and perturbation will be substantially eliminated.

The foregoing has related to nuclear resonance measurements generally, it being recognized that there are a number of atoms having magnetic moments and thus susceptible to such measurements. The present invention relates particularly to measurements of proton resonance for the purpose of distinguishing formation fluids such as hydrocarbons from formation fluids such as water. For the purpose of the present invention, it is preferable that operating parameters be of the following general orders, it being understood that they are given by way of illustration only and not by way of limitation:

If measurements are made of the formations, the magnetic field $H_0$ should have a strength of approximately 2,500 gauss in the formation. The strength of the magnetic field between the magnets 14 and 15 similarly should be in the order of 2,500 gauss when making measurements of character of flowing fluids. Based thereupon, the radio-frequency pulses should be in the order of 10 megacycles.

In view of the above parameters, the intervals $t$ will, in general, be in the order of 0.1 second. It should be noted that the pulse length, i.e. the time duration of pulse 31, Fig. 2, should be very much smaller than the interval between pulses, for example, less than .01 second.

In Fig. 1 four recorders have been adopted to record the four characteristic functions. It will be understood that, if desired, a single recorder may be utilized to produce a trace or a line graph of a combination of the four functions for each test or test site in the bore hole. Further, it will be apparent that a miniature cathode ray device may be incorporated in the bore hole unit 10 and photographed at each of a plurality of locations thereby to make a permanent record of the echo pulses such as 33, 34 and 42, 45, Figs. 2 and 3, thus eliminating the necessity of transmitting uphole the echo pulses of relatively high radio frequency.

In Fig. 2 resonance signals have not been illustrated. Similarly, in Fig. 3 free decay signals have not been indicated. However, it should be understood that the same signals exist in both Figs. 2 and 3 and that four distinct measurements may be obtained utilizing two pairs of pulses, the initial amplitude of the free decay signals 33 or 38 and 34 or 39 and the maximum amplitudes of the resonance signals 42 and 45. In order to accomplish this, gate 24, Fig. 1, may suitably be programmed to permit oscillator 22 to generate a carrier modulated by such signals for transmission by the cable 11. The modulated carrier may then be transmitted uphole to a demodulator 75.

While the invention has been described in connection with certain modifications thereof, it will be understood that further modifications will now suggest themselves to those skilled in the art and it is intended to cover such modifications as fall within the scope of the appended claims.

What is claimed is:

1. The method of logging earth formations penetrated by a bore hole which comprises polarizing protons with respect to a steady magnetic field in earth formations successively at each of a plurality of points spaced along said bore hole, at each of said points applying to said formation repeated pairs of radio-frequency magnetic pulses at predetermined spaced periods for perturbing said protons with said repeated pairs of radio-frequency magnetic pulses, said pulses having a time interval between each pair sufficient to allow the protons to substantially attain gyromagnetic relaxation equilibrium and where the period between the two pulses of each pair is predetermined and different than the period between the pulses of the next succeeding pairs, detecting two free decay gyromagnetic relaxation signals and two spin echo signals produced by said pairs of pulses, and separately recording the amplitudes of said detected signals as a function of the depths of said points.

2. The method of logging a bore hole which comprises polarizing protons in fluids in said bore hole with respect to a steady magnetic field, applying to formations adjacent said bore hole repeated pairs of radio-frequency magnetic pulses at predetermined spaced periods for perturbing said protons with said repeated pairs of radio-frequency electromagnetic pulses, said pulses having a time interval between each pair sufficient to allow the protons to substantially attain gyromagnetic relaxation equilibrium and where the period between the two pulses of each pair is different than the period between the pulses of the next succeeding pair, detecting two free decay gyromagnetic relaxation signals and two spin echo signals produced by said pairs of pulses, and separately measuring the amplitudes of said detected signals.

3. The method of characterizing formation fluids produced in a bore hole which comprises applying to said fluids in said borehole repeated pairs of magnetic pulses for perturbing protons in said fluids which are polarized with respect to a magnetic field with said repeated pairs of radio-frequency electromagnetic pulses, said pulses having a time interval between each pair sufficient to allow the protons to substantially attain gyromagnetic relaxation equilibrium and where the period between the two pulses of each pair is different than the period between the pulses of the next succeeding pair, detecting two free decay gyromagnetic relaxation signals and two spin echo signals produced by said pairs of pulses, and separately measuring the amplitudes of said detected signals.

4. The method of logging a bore hole which comprises polarizing protons in the bore hole fluids with respect to a steady magnetic field successively at at least two points in said bore hole, applying to said fluids repeated pairs of radio-frequency magnetic pulses at predetermined spaced periods for perturbing the protons in said fluids with said repeated pairs of radio-frequency field pulses, said pulses having a time interval between each pair sufficient to allow the protons to substantially attain gyromagnetic relaxation equilibrium and where the period between the two pulses of each pair is different than the period between the pulses of the next succeeding pair, varying the depth of said points in said well bore in the direction of, and at a rate equal to, the flow of said fluids at said points, successively at each of said points detecting two free decay gyromagnetic relaxation signals and two spin echo signals produced by said pairs of pulses, and separately recording the amplitudes of said detected signals as a function of the depths of said points.

5. Means for logging earth formations penetrated by a bore hole which comprises means for applying a steady magnetic field nuclearly to polarize protons in earth formations successively at each of a plurality of points spaced along said bore hole, means for applying at each of said points repeated pairs of radio-frequency magnetic pulses at intervals between each pair of pulses sufficient to allow the protons to attain equilibrium and where the period between the two pulses of each pair is predetermined and different than the period between the pulses of the next succeeding pairs to perturb the polarized protons, means for detecting two free decay signals and two echo signals produced by said pairs of pulses, and means for separately recording the amplitudes of said detected signals as a function of the depths of said points for determination of the ratio of longitudinal to transverse relaxation times of said protons.

6. Means for logging a bore hole which comprises means for applying a steady magnetic field for polarizing protons in fluids in said bore hole, means for applying repeated pairs of radio-frequency electromagnetic pulses with the interval between each pair of pulses sufficient to allow the protons to attain equilibrium and where the period between the two pulses of each pair is different than the period between the pulses of the next succeeding pair, means for detecting two free decay signals produced by said pairs of pulses, means for detecting two echo signals produced by said pairs of pulses, and means for separately measuring the amplitudes of said detected signals for determination of the ratio between the longitudinal nuclear magnetic relaxation and the transverse nuclear magnetic relaxation time of said protons.

7. Means for characterizing formation fluids produced in a bore hole which comprises means for perturbing nuclearly polarized protons in said fluids with repeated pairs of radio-frequency electromagnetic pulses where the interval between each pair of pulses is sufficient to allow the protons to attain equilibrium and where the period between the two pulses of each pair is different than the period between the pulses of the next succeeding pair, means for detecting two free decay signals produced by said pairs of pulses, means for detecting two echo signals produced by said pairs of pulses, and means for separately measuring the amplitudes of said detected signals whereby the ratio of the longitudinal relaxation time and the transverse relaxation time of said protons may be determined.

8. The method of logging earth formations penetrated by a borehole wherein protons in said formations are polarized with respect to a steady magnetic field, which comprises applying to said formations at each of a plurality of points spaced along said borehole repeated pairs of magnetic field pulses at predetermined spaced periods for perturbing said protons, said pulses having a time interval between each pair sufficient to allow the protons substantially to attain gyromagnetic relaxation equilibrium and where the period between the two pulses of one pair is predetermined and different than the period between the pulses of the other pair, detecting two free decay gyromagnetic relaxation signals and two spin echo signals produced by said pairs of pulses, and separately recording the amplitudes of the detected signals as functions of the depths of said points.

References Cited in the file of this patent

UNITED STATES PATENTS

| | | |
|---|---|---|
| 2,259,904 | McNamee et al. | Oct. 21, 1941 |
| 2,535,666 | Broding | Dec. 26, 1950 |

OTHER REFERENCES

Hahn: Physical Review, volume 76, page 145 (1949).
Hahn: Physical Review, volume 77, page 297 (1950).
Hahn: Physical Review, volume 80, page 580 (1950).
Hahn: Physics Today, November 1953, pages 4–9.

UNITED STATES PATENT OFFICE
CERTIFICATION OF CORRECTION

Patent No. 2,968,761                                       January 17, 1961

John R. Zimmerman et al.

It is hereby certified that error appears in the above numbered patent requiring correction and that the said Letters Patent should read as corrected below.

Column 1, line 70, "ratio" should appear in italic print; column 3, line 28, for "dectectable" read -- detectable --; column 4, line 3, equation (2) should appear as shown below instead of as in the patent:

$$V(t) \propto e^{-2t/T_2} e^{-kt^3}$$

column 7, line 7, for "of, and at a rate equal to," read -- of and at a rate equal to --.

Signed and sealed this 20th day of June 1961.

(SEAL)
Attest:

ERNEST W. SWIDER                        DAVID L. LADD

Attesting Officer                       Commissioner of Patents